US010895288B1

(12) United States Patent
Mann et al.

(10) Patent No.: US 10,895,288 B1
(45) Date of Patent: Jan. 19, 2021

(54) CLUTCH PACK RETAINING SYSTEM

(71) Applicant: BD Engine Brake Inc., Abbotsford (CA)

(72) Inventors: Amritpal Singh Mann, Surrey (CA); Shayne Donovan Harder, Abbotsford (CA); Demissie Yigebiru, Chilliwack (CA)

(73) Assignee: BD Engine Brake Inc., Abbotsford (CA)

( * ) Notice: Subject to any disclaimer, the term of this patent is extended or adjusted under 35 U.S.C. 154(b) by 35 days.

(21) Appl. No.: 16/538,704

(22) Filed: Aug. 12, 2019

(51) Int. Cl.
 *F16D 13/70* (2006.01)
 *F16D 13/52* (2006.01)
 *F16D 13/64* (2006.01)
 *F16D 13/68* (2006.01)

(52) U.S. Cl.
 CPC ............. *F16D 13/70* (2013.01); *F16D 13/52* (2013.01); *F16D 13/648* (2013.01); *F16D 13/683* (2013.01)

(58) Field of Classification Search
 CPC .. F16D 13/22–2013/565; F16D 13/648; F16D 13/70
 See application file for complete search history.

(56) References Cited

U.S. PATENT DOCUMENTS

| 4,815,189 | A  | * | 3/1989  | Ijames     | F16D 13/385 |
|           |    |   |         |            | 192/70.13   |
| 7,063,197 | B2 | * | 6/2006  | Merkel     | F16D 13/648 |
|           |    |   |         |            | 192/109 R   |
| 9,624,984 | B2 | * | 4/2017  | Dick       | F16D 13/40  |
| 10,132,364| B2 | * | 11/2018 | Deneszczuk | F16D 25/00  |
| 10,215,237| B2 | * | 2/2019  | Deneszczuk | F16D 28/00  |
| 2005/0000776 | A1 | * | 1/2005 | Merkel  | F16D 25/12  |
|           |    |   |         |            | 192/109 R   |
| 2016/0208865 | A1 | * | 7/2016 | Dick    | F16D 13/74  |
| 2018/0031048 | A1 | * | 2/2018 | Deneszczuk | F16D 25/00 |
| 2018/0031050 | A1 | * | 2/2018 | Deneszczuk | F16D 28/00 |

* cited by examiner

*Primary Examiner* — David R Morris
(74) *Attorney, Agent, or Firm* — Oyen Wiggs Green & Mutala LLP

(57) ABSTRACT

Example embodiments of the disclosed technology provide a clutch pack retention system. The system may comprise a backup plate assembly. The backup plate assembly may comprise a pair of plates that are coupled together. The pair of plates may comprise first and second plates. The first and second plates comprise teeth. The teeth of the first plate may be removably engageable with corresponding portions of a circumferential groove extending along an inner diameter of a drum of a clutch system. The teeth of the second plate may be removably engageable with corresponding grooves extending longitudinally into the drum of the clutch system. Coupling the first and second plates together may angularly offset teeth of the first plate relative to teeth of the second plate.

20 Claims, 19 Drawing Sheets

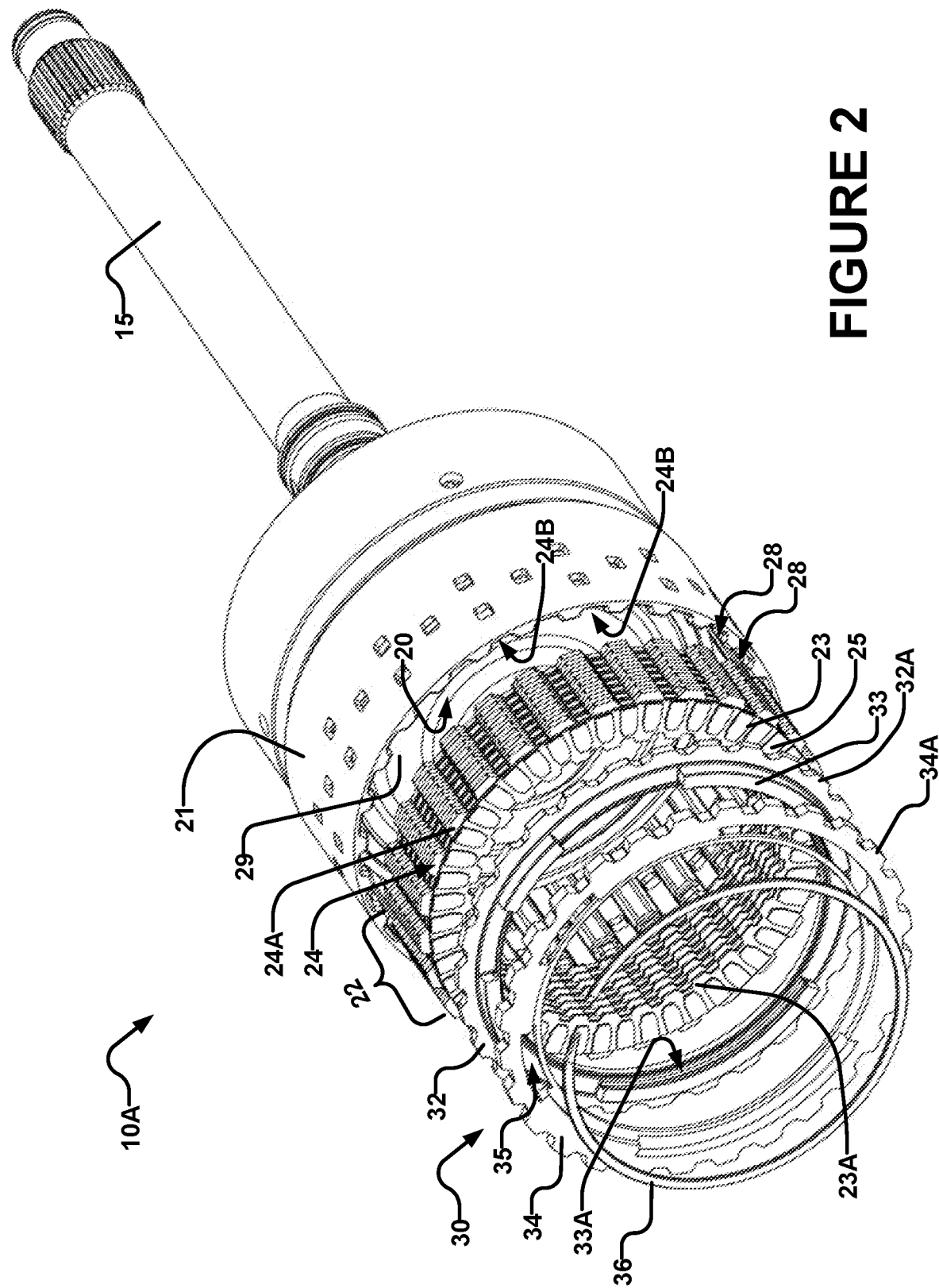

CLUTCH PACK RETAINING SYSTEM

FIELD

The technology described herein relates to clutches. The clutches have example application in automatic transmissions. Embodiments of the present technology include a novel retainer assembly for retaining a clutch pack in a clutch.

BACKGROUND

Automatic transmissions are ubiquitous in vehicles. Automatic transmissions generally include one or more clutches. The clutches typically include a stack of plates or disks (collectively a "clutch pack") that frictionally engage one another when forced together. A first set of the plates or disks is interleaved with a second set of the plates of disks. The first set is coupled to be driven by an input of the clutch. The second set is coupled to drive an output of the clutch. The first set of plates or disks frictionally engage the second set of plates or disks when the plates or disks are forced together. Most typically a clutch pack includes friction disks that are faced with a friction material which alternate with steel plates. Many automatic transmissions include one or more clutches that have this construction. Some examples include automatic transmissions available from the Ford Motor Company and Allison Transmission™ of the United States. For example, the Ford™ 6R140 automatic transmission includes a number of clutches that have this basic construction.

It can be desirable to increase the torque capacity of a clutch, especially for high performance applications or cases where the design of a clutch provides too little torque capacity to maintain reliability in an originally intended application of the clutch.

A larger clutch may have a higher torque capacity than a similar clutch with smaller dimensions. However, in existing transmissions the maximum dimensions of a clutch are generally fixed by other components of the transmission. Even when designing new transmissions there is a general desire in many applications to make the transmissions compact.

One way to increase torque capacity of a clutch is to increase an amount of force that is applied to compress the clutch disks together when the clutch is engaged. Where clutches are actuated by hydraulic pressure, increased force may be achieved by increasing the hydraulic system pressure in the transmission. However, this approach tends to cause increased heating of transmission fluid, which is undesirable. Also there is a limit to how much the hydraulic system pressure can be increased without damaging or reducing the reliability of transmission components. Additionally, increased hydraulic system pressure typically results in increased parasitic loss (e.g. the transmission is less efficient).

In some cases, an existing transmission may be replaced with a higher performance transmission. However, doing so is often expensive and/or time intensive. Furthermore, in some cases there may not be enough space for the higher performance transmission.

In some cases, the torque capacity of a clutch can be increased by increasing the number of clutch disks in a clutch pack. For example, clutch packs that include thinner aftermarket clutch disks made of advanced materials are available for some transmissions. However, the space into which such clutch packs must fit are limited by the dimensions of other components of the clutch.

There is a general need for ways to provide clutches that are reliable and have high torque capacity for automatic transmissions and other applications.

SUMMARY

This invention has a number of aspects, these include without limitation:
  clutches suitable for use in automatic transmissions or other applications,
  clutch backing plates,
  automatic transmissions, and
  methods for retaining clutch packs.

One aspect provides a backup plate assembly for a clutch of an automatic transmission. The assembly may comprise a first plate comprising a first plurality of teeth spaced apart around an outer circumference of the first plate. The teeth of the first plurality of teeth may be removably insertable into corresponding portions of a circumferential groove which extends around an inner surface of a drum of the clutch. The assembly may also comprise a second plate couplable with the first plate. The second plate may comprise a second plurality of teeth spaced apart around an outer circumference of the second plate. The teeth of the second plurality of teeth may be removably insertable in corresponding longitudinal grooves of the drum. The longitudinal grooves may extend longitudinally inwards into the drum. The first plurality of teeth may be angularly offset from the second plurality of teeth. Coupling the first and second plates together may preserve the angular offset between the first plurality of teeth and the second plurality of teeth.

In some embodiments coupling the first and second plates together secures the teeth of the first plurality of teeth in the corresponding portions of the circumferential groove and the teeth of the second plurality of teeth in the corresponding longitudinal grooves of the drum.

In some embodiments an inner surface of the first plate abuts an inner edge of the circumferential groove.

In some embodiments the circumferential groove is configured to receive a snap ring.

In some embodiments the first plate comprises at least one boss and the second plate comprises at least one corresponding aperture or recess configured to receive the boss.

In some embodiments the at least one boss comprises a snap ring groove configured to receive a snap ring. The snap ring may be configured to axially secure the first plate relative to the second plate.

In some embodiments the at least one aperture or recess comprises one or both of chamfered and/or filleted edges and chamfered and/or filleted corners.

In some embodiments the first plate comprises a plurality of bosses and the second plate comprises a plurality of corresponding apertures or recesses configured to receive the bosses.

In some embodiments each one of the plurality of bosses is identical to the other ones of the plurality and each of the apertures or recesses of the plurality is identical to the other ones of the plurality.

In some embodiments each of the bosses and each of the apertures are equally spaced apart around the first and second plates respectively.

In some embodiments at least two bosses in the plurality of bosses are different from one another.

In some embodiments the first plate comprises at least one rivet rigidly coupled to the first plate and the second plate comprises a corresponding aperture configured to receive the at least one rivet.

In some embodiments the first and second plates comprise corresponding apertures configured to receive a fastener.

In some embodiments the fastener comprises at least one of a press-fit dowel pin and a threaded fastener.

In some embodiments the first plate comprises an axially outwardly projecting member comprising a first plurality of splines and the second plate comprises a second plurality of corresponding splines on an inner diameter of the second plate. Meshing the first plurality of splines with the second plurality of corresponding splines may rotationally secure the first plate relative to the second plate.

In some embodiments the axially outwardly projecting member of the first plate comprises a snap ring groove. The snap ring grove of the projecting member may be configured to receive a snap ring. The snap ring may be configured to axially secure the first plate relative to the second plate.

In some embodiments teeth of one or both of the first and second plates are evenly spaced apart from adjacent teeth.

Another aspect provides an automatic clutch. The automatic clutch may comprise a drum that comprises a cavity longitudinally extending between first and second ends of the drum. The drum may also comprise longitudinal grooves extending longitudinally inwards from the first end towards the second end of the drum along an inner surface of the drum. The drum may also comprise a circumferential groove extending around an inner surface of the drum. The circumferential groove may be proximate to the first end of the drum. The automatic clutch may also comprise a backup plate assembly as described elsewhere herein coupled to the drum proximate to the first end of the drum.

In some embodiments at least one portion of the circumferential groove is between adjacent ones of the longitudinally extending grooves.

Another aspect provides a method for coupling a backup plate assembly as described elsewhere herein to a drum of a clutch for an automatic transmission. The method may comprise inserting a first plurality of teeth of a first plate of the backup plate assembly into corresponding longitudinal grooves of the drum. The method may also comprise rotating the first plate relative to the drum to insert the first plurality of teeth into corresponding portions of a circumferential groove extending around an inner diameter of the drum. The method may also comprise inserting a second plurality of teeth of a second plate of the backup assembly into the corresponding longitudinal grooves. The method may also comprise coupling the first and second plates together.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

FIG. 2 is an exploded perspective view of a clutch according to an example embodiment.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
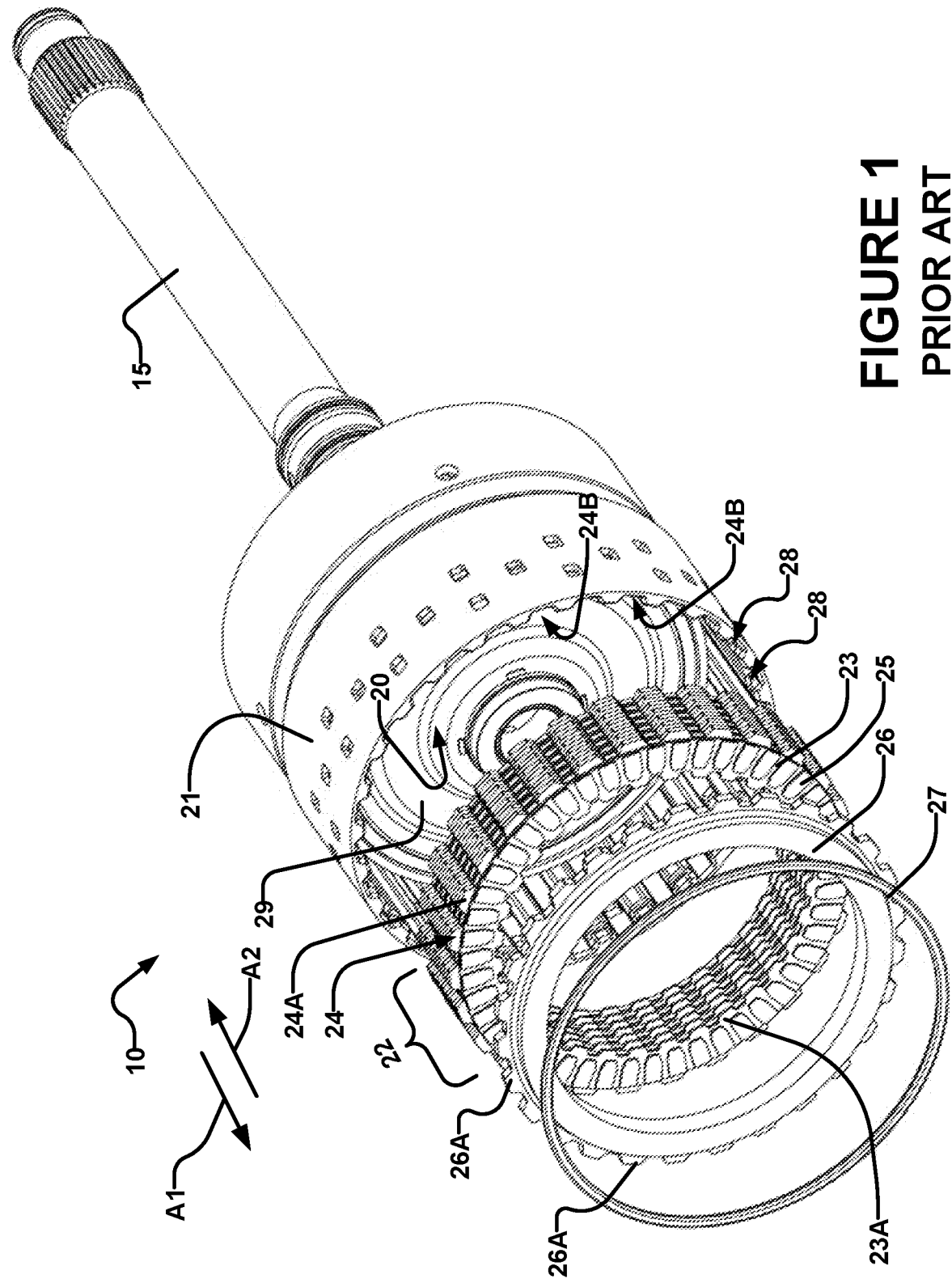
FIG. 1 is an exploded perspective view of an example prior art clutch.

FIG. 1 is an exploded perspective view of an example prior art clutch 10. Clutch 10 can engage and/or disengage power transmission between a first shaft 15 and a second shaft 16 (see FIG. 1B) that is concentric with drum 21.

Clutch 10 comprises a clutch pack 22. Clutch pack 22 is received within a cavity 20 in drum 21. Clutch pack 22 is made up of a plurality of clutch disks. Typically, clutch pack 22 comprises a first set of disks 24 that are each coupled to rotate together with drum 21 and a second set of disks 23 that are each coupled to rotate together with second shaft 16. In some embodiments, as shown in FIG. 1B, a cog 17 is coupled to second shaft 16. In some embodiments cog 17 is coupled to an end of second shaft 16. Each disk 23 may be coupled to rotate together with cog 17. Rotation of cog 17 rotates second shaft 16.

Engagement of first disks 24 with second disks 23 (e.g. by longitudinally compressing clutch pack 22) rotationally couples drum 21 with second shaft 16 and/or cog 17. Disengagement of first disks 24 from second disks 23 (e.g. by relaxing compression of clutch pack 22 so that first disks 24 can separate slightly from second disks 23) allows the drum and second shaft and/or cog to rotate relative to one another.

In FIG. 1 compression of clutch pack 22 can be achieved by advancing a piston mechanism 29 (or other actuator mechanism) toward a backing plate 26 that is axially fixed relative to drum 21. Piston mechanism 29 is typically activated by hydraulic pressure.

Figure 1A:
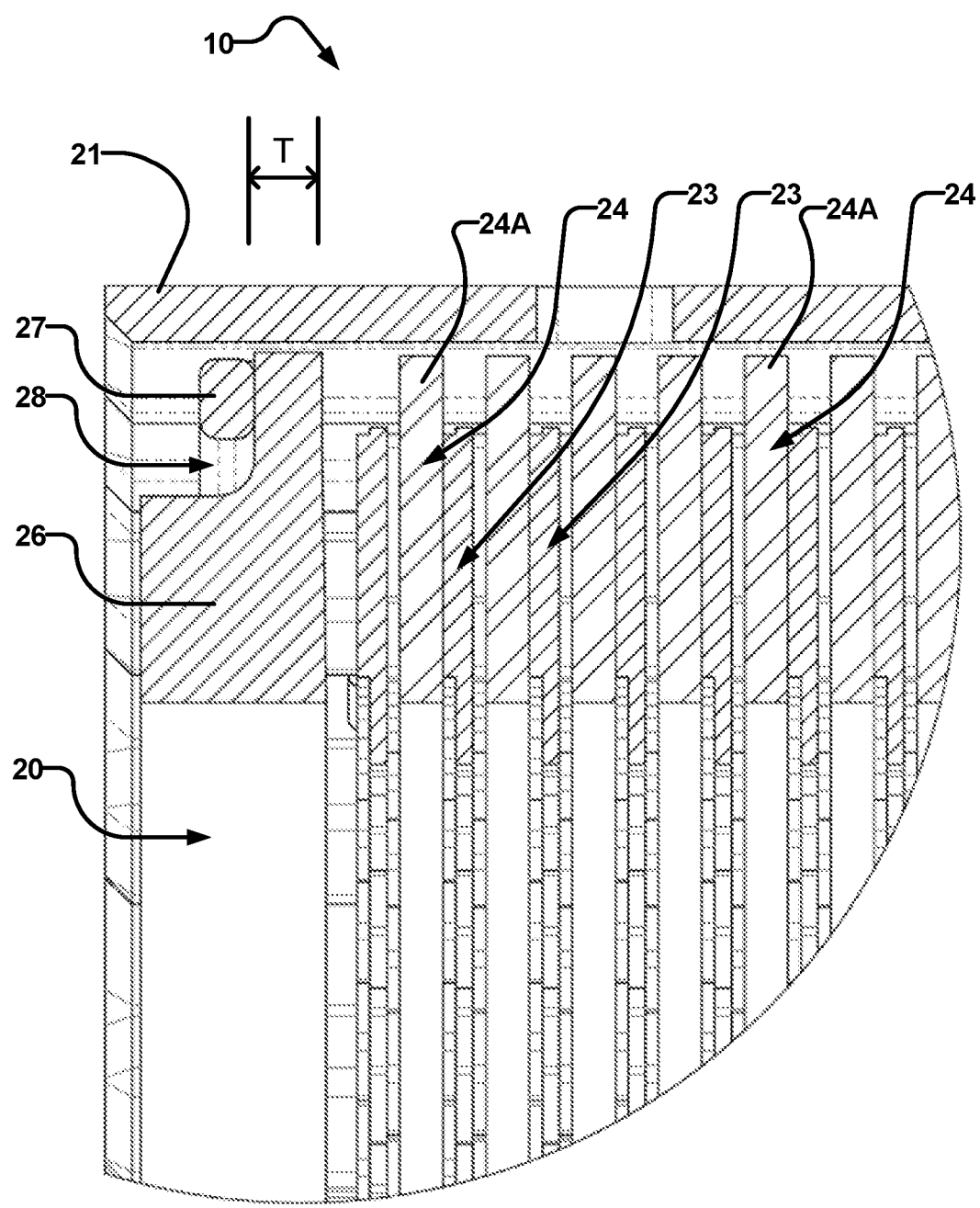
FIG. 1A is a partial cross-sectional view of the clutch of FIG. 1.
Figure 1B:
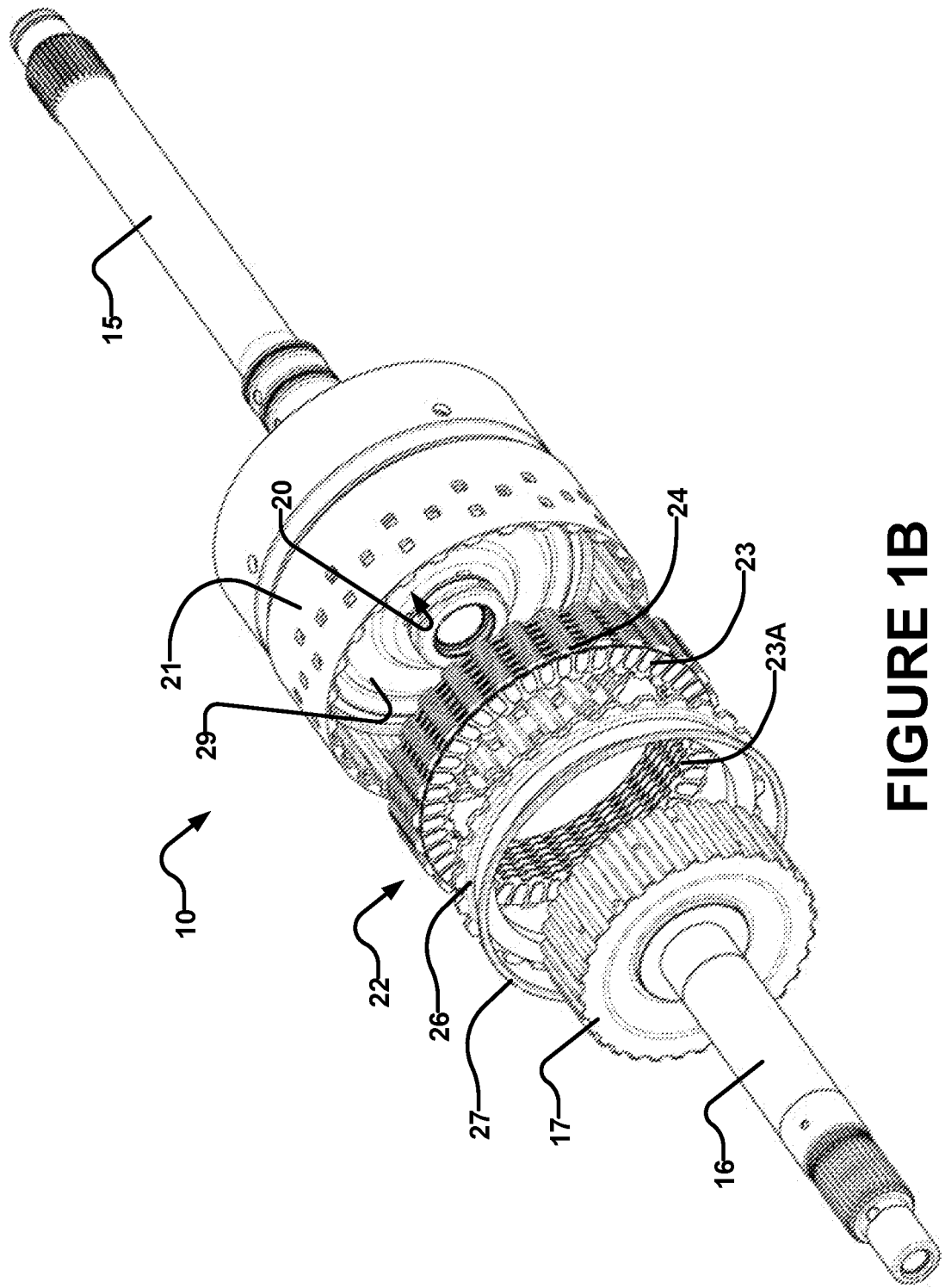
FIG. 1B is an exploded perspective view of the clutch of FIG. 1.
Figure 1C:
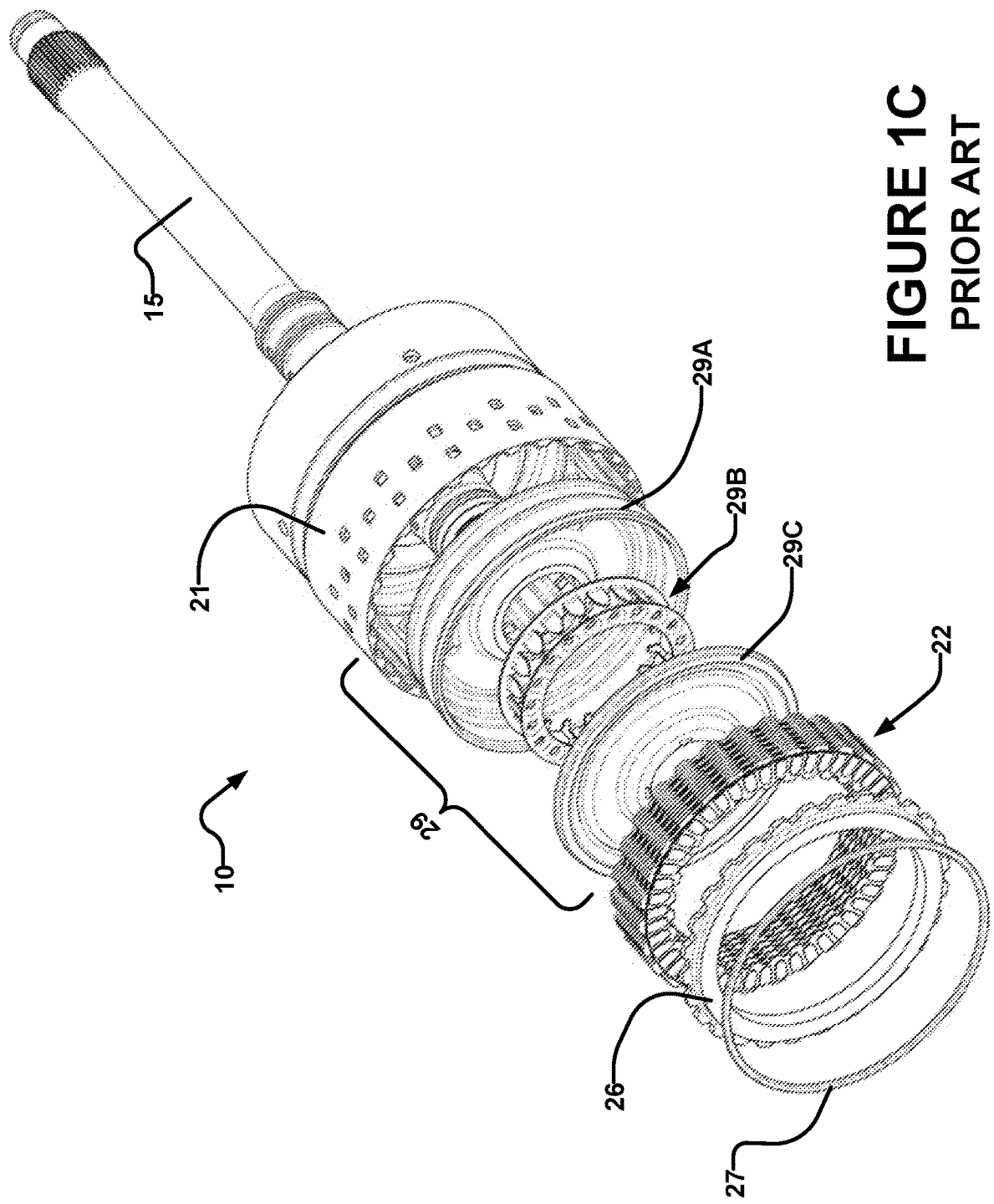
FIG. 1C is an exploded perspective view of a portion of the clutch of FIG. 1.
Figure 1D:
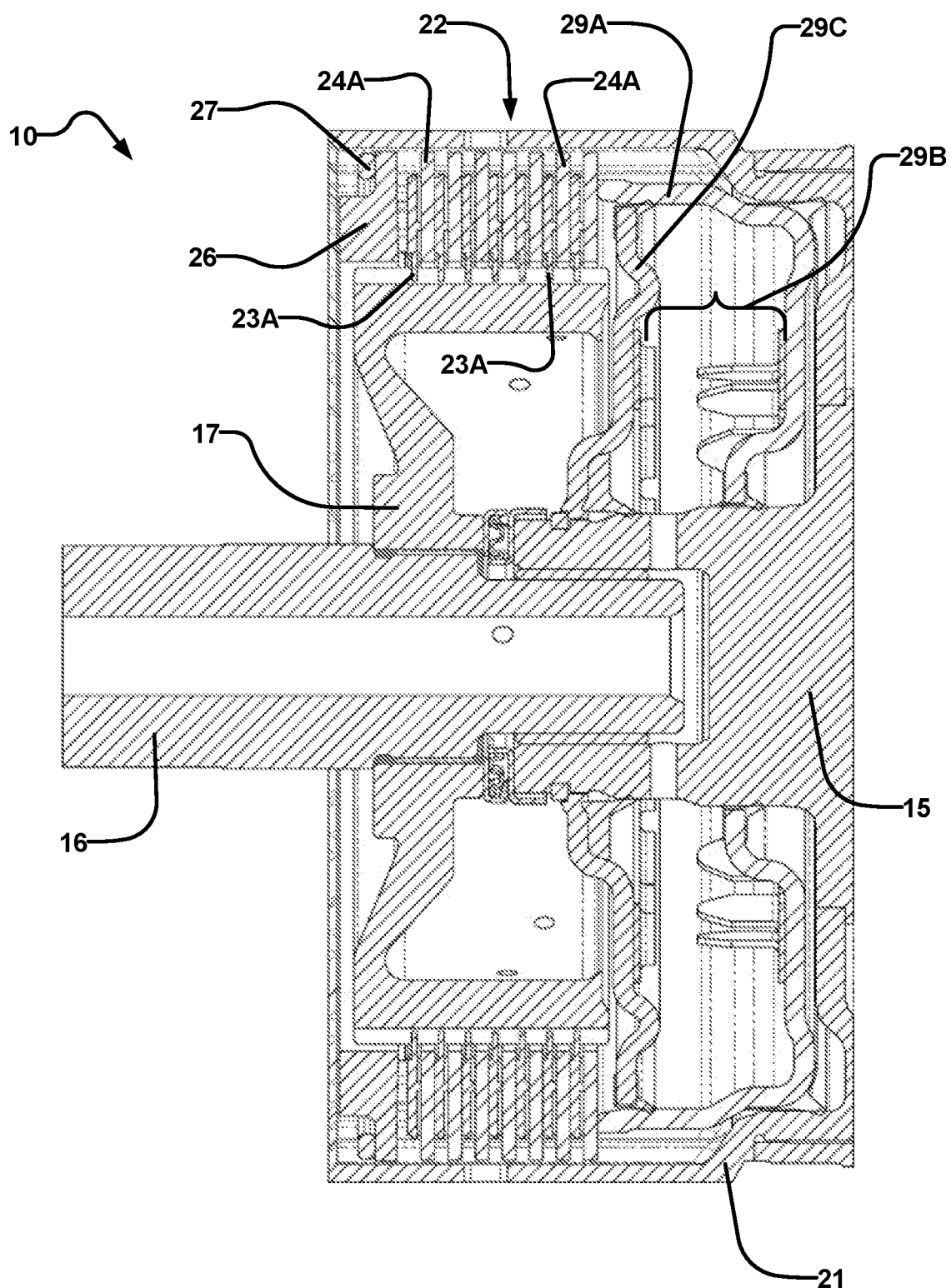
FIG. 1D is a cross-sectional view of the clutch of FIG. 1.

Piston mechanism 29 may, for example, comprise an actuator piston 29A (commonly known as an "apply piston") (see e.g. FIG. 1C). Actuator piston 29A may be advanced towards clutch pack 22 to compress clutch pack 22. In some embodiments, a spring pack 29B assists with returning actuator piston 29A to its initial position when clutch 10 is disengaged. Advancing piston 29A toward clutch pack 22 compresses spring pack 29B. A balance piston 29C may cap piston mechanism 29. Balance piston 29C may also prevent axial movement of spring pack 29B towards clutch pack 22 (e.g. balance piston 29C retains spring pack 29B within piston mechanism 29). FIG. 1D shows a cross-sectional view of clutch 10 and piston mechanism 29. FIGS. 1C and 1D illustrate an exemplary piston mechanism 29. Different clutches may have different piston mechanisms 29.

Disks 23 comprise internal teeth 23A configured to engage corresponding longitudinally extending grooves in cog 17 (or second shaft 16). Engagement of teeth 23A in the corresponding grooves (or splines, teeth, etc.) of cog 17 (or second shaft 16) rotationally couples disks 23 to the cog and/or second shaft (e.g. disks 23 rotate together with the cog and/or second shaft).

Disks 24 comprise external teeth 24A configured to engage corresponding longitudinally extending grooves 24B in the interior of drum 21. Engagement of teeth 24A in the corresponding grooves 24B rotationally couples disks 24 to drum 21 (e.g. disks 24 rotate together with drum 21).

One or both of disks 23 and 24 may be faced with a friction enhancing material. FIG. 1 shows friction pads 25. Friction pads 25 increase friction between adjacent ones of disks 23 and 24 when clutch 10 is engaged. Increasing friction may reduce the likelihood that disks 23 can "slip" (i.e. rotate by a different amount) relative to disks 24 when clutch pack 22 is compressed. FIG. 1 shows the example case where each of disks 23 comprises a plurality of friction pads 25 positioned around its circumference.

Figure 1E:
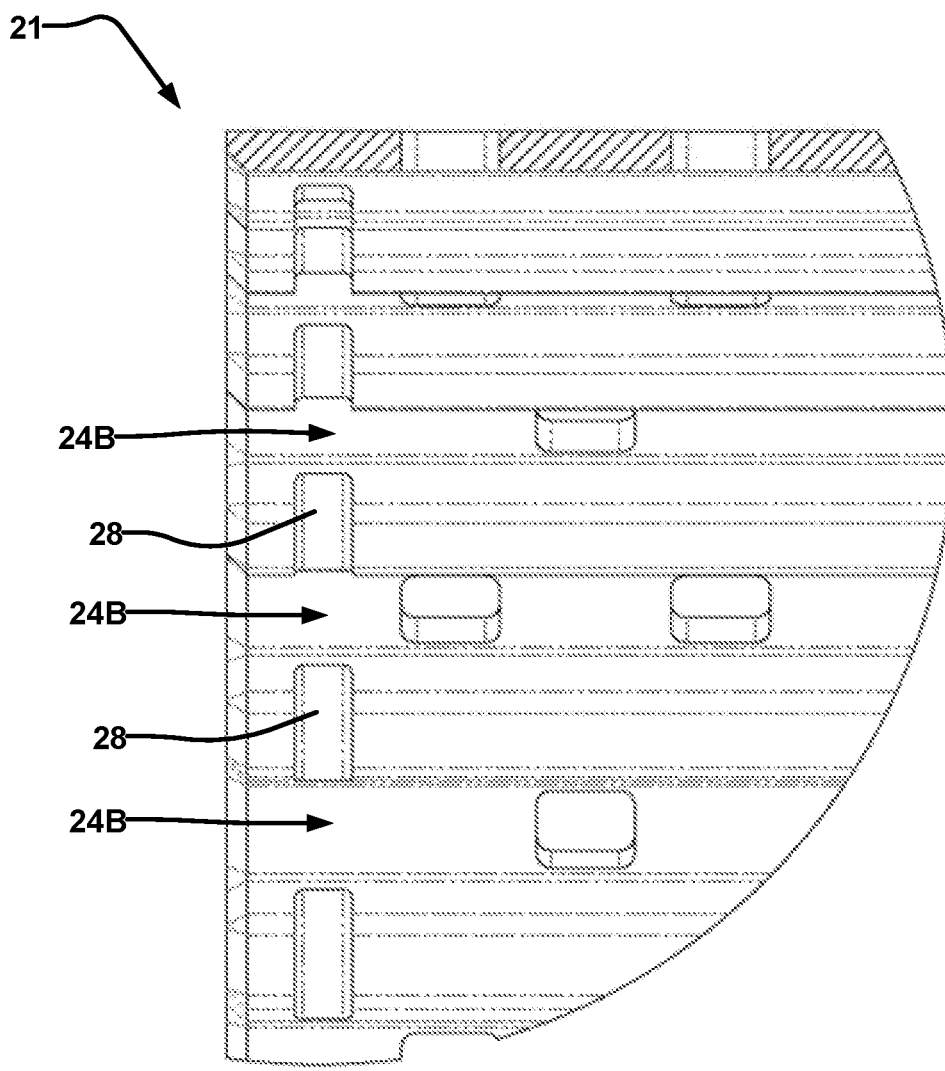
FIG. 1E is a partial cross-sectional view of a drum of the clutch of FIG. 1.

Clutch pack 22 is retained within cavity 20 by a backup plate 26. Backup plate 26 comprises external teeth 26A. Teeth 26A may be similar to teeth 24A. Teeth 26A are each configured to be received within a corresponding one of grooves 24B of drum 21. Backup plate 26 is removably insertable into drum 21 past a snap ring groove 28 (see e.g. FIG. 1E which shows a portion of an internal surface of drum 21). Backup plate 26 is retained in drum 21 by a snap ring 27 which engages snap ring groove 28. Once inserted, snap ring 27 axially secures backup plate 26 within drum 21 (e.g. snap ring 27 prevents plate 26 from axially escaping from drum 21).

Clutch pack 22 is dimensioned to fit between piston mechanism 29 and backup plate 26 with enough clearance for clutch 10 to be fully disengaged and little enough clearance that clutch 10 can be fully engaged within the range of actuation of piston mechanism 29.

As shown in FIG. 1A, backup plate 26 extends longitudinally into cavity 20 by a distance T past snap ring groove 28. The axial dimension of clutch pack 22 is limited by the distance between the inside of backup plate 26 and the outer face of piston mechanism 29.

Movement of piston mechanism 29 toward plate 26 (i.e. in the direction of arrow A1) compresses clutch pack 22 and frictionally engages clutch disks 23 with clutch disks 24. Movement of piston mechanism 29 away from backup plate 26 (i.e. in the direction of arrow A2) allows clutch disks 23 to slightly separate from clutch disks 24.

One aspect of the technology disclosed herein provides a clutch that includes a novel backup plate assembly. The novel backup plate assembly may replace backup plate 26 and snap ring 27. In some embodiments the backup plate assembly is designed to provide an axial distance between a pressure plate or other clutch actuator and an inner face of the backup plate assembly that is greater than that provided where a conventional backup pate 26 and snap ring 27 are used (as shown e.g. in FIGS. 1 and 1A). For example, an inner face of the backup plate assembly may be axially aligned with an inside edge of snap ring groove 28. In such embodiments there is more room to provide a clutch pack 22 that has more disks 23 and/or 24, thereby providing the potential for increased torque capacity of the clutch.

The present technology has applications in retrofitting existing clutches for improved performance and in the manufacture of new clutches. Where the present technology is applied to retrofit an existing clutch, the technology preferably includes a backup plate assembly that has a lower depth profile than the stock backup plate 26 it may replace. "Lower depth profile" means that the backup plate assembly extends axially into the cavity of drum 21 less than plate 26 does. Advantageously, the lower depth profile facilitates insertion of one or more additional clutch disks 23 and/or 24 into cavity 20 without changing drum 21. Where the present technology is applied to making new manufacture clutches the use of a backup plate assembly as described herein may permit higher performance (e.g. increased torque capacity) in a clutch of the same or smaller outside dimensions.

FIG. 2 is an exploded perspective view of clutch system 10A comprising an example backup plate assembly 30. Advantageously, backup plate assembly 30 can be designed so that it does not extend axially into cavity 20 past an inside edge of snap ring groove 28. In the example case illustrated by FIG. 2, clutch 10A comprises an additional disk 23 and an additional disk 24 as compared to clutch 10 (e.g. clutch pack 22 of clutch system 10A comprises a total of 8 disks 23 and 8 disks 24). Different clutch packs 22 compatible with clutch system 10A may have more or fewer disks 23 and/or 24 than clutch pack 22 illustrated in FIG. 2.

Backup plate assembly 30 comprises a pair of plates 32, 34. Plates 32, 34, when installed as described below, retain clutch pack 22 in cavity 20. Backup plate assembly 30 advantageously may axially hold clutch pack 22 against axial forces exerted by piston mechanism 29 and/or may transfer some torque between drum 21 and clutch pack 22.

Plate 32 can be engaged to prevent longitudinal movement of backup plate assembly 30. As shown in FIG. 2, plate 32 comprises teeth 32A. Each of teeth 32A may be received within a corresponding portion of a circumferential groove extending circumferentially around an inner diameter of drum 21. In preferred embodiments teeth 32A are received within corresponding portions of snap ring groove 28.

Figure 2A:
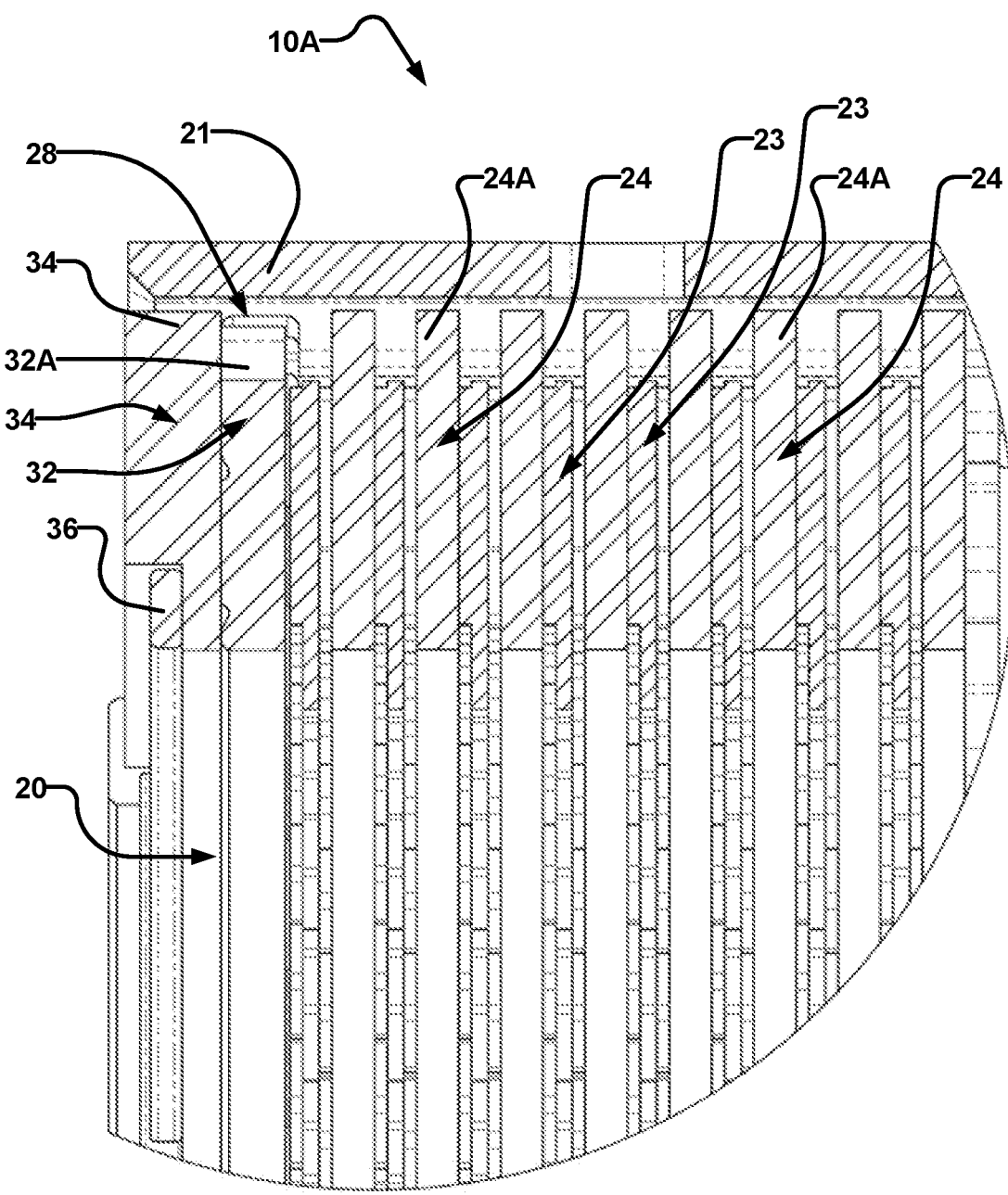
FIG. 2A is a partial cross-sectional view of the clutch of FIG. 2.

Preferably, plate 32 does not extend longitudinally into cavity 20 past snap ring groove 28 (see FIG. 2A). In some embodiments the circumferential groove does not extend around all of the inner diameter of drum 21. In some embodiments the circumferential groove extends around 50-100% of the inner diameter of drum 21.

Typically, to secure plate 32 within drum 21 teeth 32A are first inserted into corresponding grooves that extend longitudinally into drum 21 (e.g. grooves 24B). Once teeth 32A are advanced so that they have entered the circumferential groove (e.g. snap ring groove 28), plate 32 may be rotated to move teeth 32A out of alignment with longitudinal grooves 24B. When teeth 32A are located in the circumferential groove and are located between longitudinal grooves 24B plate 32 is axially secured within drum 21.

Rotational forces exerted on plate 32 by clutch pack 22 could cause rotation of plate 32 thereby rotating teeth 32A out of the corresponding portions of the circumferential groove in which teeth 32A hold plate 32 against axial movement in drum 21. Plate 34 is configured to stop plate 32 from rotating relative to drum 21 when plate 34 is installed as described below.

Plate 34 comprises teeth 34A. Teeth 34A may be similar to teeth 26A and/or 24A described elsewhere herein. Each of teeth 34A may be inserted into a corresponding longitudinal groove in drum 21. In preferred embodiments each of teeth 34A are received within a corresponding one of grooves 24B.

In FIG. 2, teeth 32A and 34A are shown as being evenly spaced around outer circumferences of plates 32 and 34 respectively. However, this is not mandatory.

Although the circumferential groove extending around the inner diameter of drum 21 has been described as a single groove (e.g. snap ring groove 28), in some embodiments the circumferential groove is not continuous (i.e. the circumferential groove 28 may be interrupted). "Interrupted" means that the circumferential groove does not comprise a single groove continuously extending angularly around the inner diameter of drum 21. In some embodiments the circumferential groove is interrupted at a plurality of points around the inner diameter of drum 21.

Plate 34 can be coupled to plate 32 by way of a coupling which prevents relative rotation of plates 32, 34. When plate 32 is coupled to plate 34, teeth 32A are angularly offset from teeth 34A. The amount of angular offset is such that when teeth 34A are engaged in corresponding grooves 24B, then teeth 32A are located between adjacent ones of grooves 24B. Preferably, each of plates 32, 34 is oriented relative to the other one of plates 34, 32 such that the pair of plates (and backup plate assembly 30) is able to counteract any longitudinally outward forces as well as any rotational forces that may be exerted on the pair of plates during operation of the clutch. Advantageously, plates 32, 34 may be configured so that they are automatically held together with the correct angular offset of teeth 34A and 32A when they are coupled together.

Figure 3A:
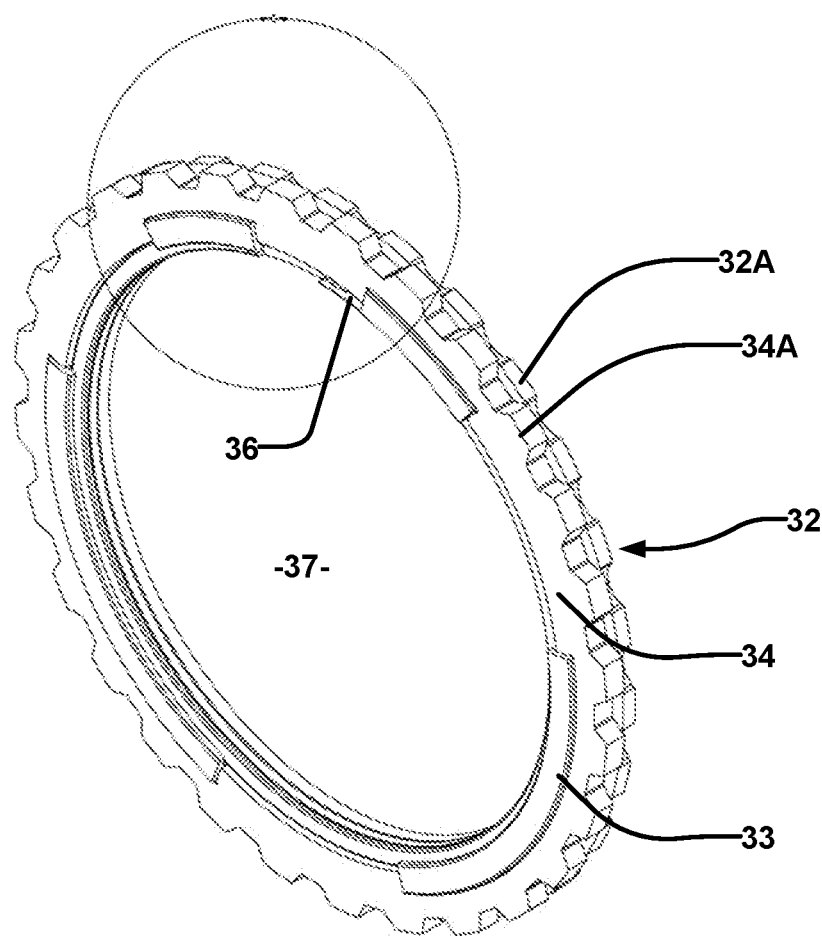
FIG. 3A is a perspective view of a backup plate assembly according to an example embodiment.
Figure 3B:
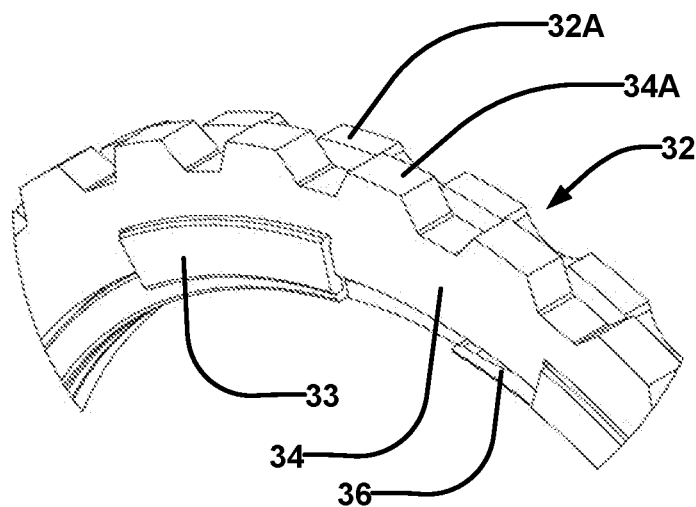
FIG. 3B is an enlarged perspective view of a portion of the backup plate assembly of FIG. 3A.

As shown in FIGS. 3A and 3B, coupling plates 32 and 34 together offsets teeth 32A relative to teeth 34A. In the illustrated embodiment, teeth 32A may be inserted in corresponding portions of snap ring groove 28 to prevent axial movement of plate 32 (and backup plate assembly 30) relative to drum 21. Teeth 34A engage grooves 24B and plate 34 is coupled to plate 32 in a way that angularly fixes plate 34 to plate 32. Plate 34 is prevented from rotating relative to drum 21 by the engagement of teeth 34A in grooves 24B. When plates 32 and 34 have been coupled together in drum 21 as described above:

- plate 32 is prevented from moving axially relative to drum 21 because teeth 32A are located in snap ring groove 28 between longitudinal grooves 24B;
- plate 34 is prevented from rotating relative to drum 21 because teeth 34A are engaged in grooves 24B;
- plate 32 is prevented from rotating relative to drum 21 because it is coupled to plate 34 by a coupling that does not permit plate 32 to rotate relative to plate 34; and
- plate 34 is prevented from moving axially relative to drum 21 because it is coupled to plate 32 by a coupling that does not permit plate 34 to move axially relative to plate 32.

There are many possible designs for couplings which may be applied to couple plates 32 and 34 in a way that: prevents relative rotation of plates 32, 34; prevents axial separation of plates 32, 34; and/or maintains a desired angular offset between teeth 34A and teeth 32A. Various non-limiting examples of such couplings are described below.

Plates 32 and 34 may be permanently or non-permanently coupled together. To facilitate servicing of a clutch it is preferable to couple plates 32, 34 using couplings that can be efficiently removed and replaced.

In some embodiments, a coupling provides projections from one or both of plates 32, 34 that are configured to engage in corresponding receiving features such as recesses, bores or apertures in the other one of plates 34, 32. The projections and receiving features may be configured so that the projections can be engaged into the receiving features by axial relative movement of plates 32, 34 and, when so engaged, plates 32, 34 are locked against relative rotation. The projections may, for example, comprise tapered or straight pins, bosses, teeth, or the like.

For example, plate 32 may comprise one or more bosses 33. Each boss 33 may be received in a corresponding recess or aperture 35 of plate 34.

Figure 4A:
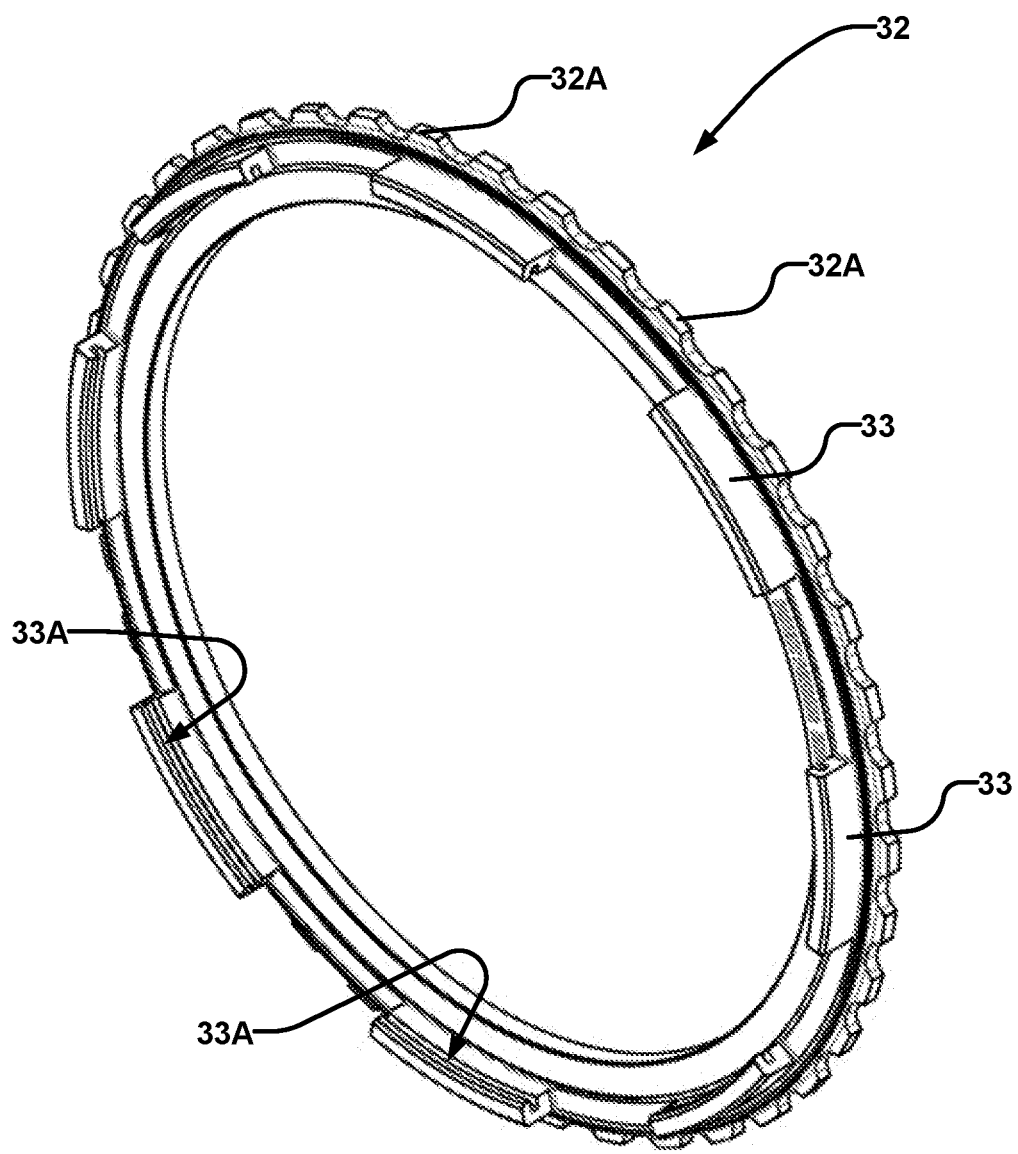
FIGS. 4A-5B are schematic illustrations of example plates of a clutch pack retention system.
Figure 4B:
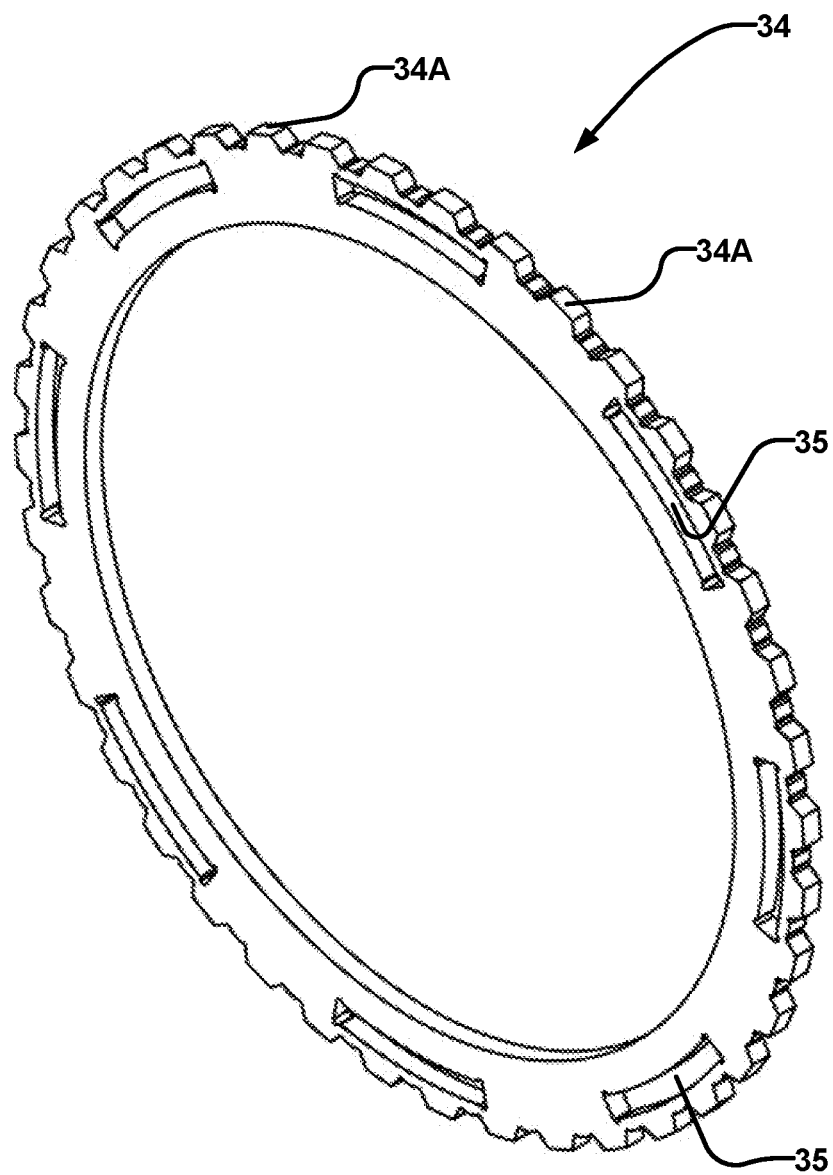
Figure 5A:
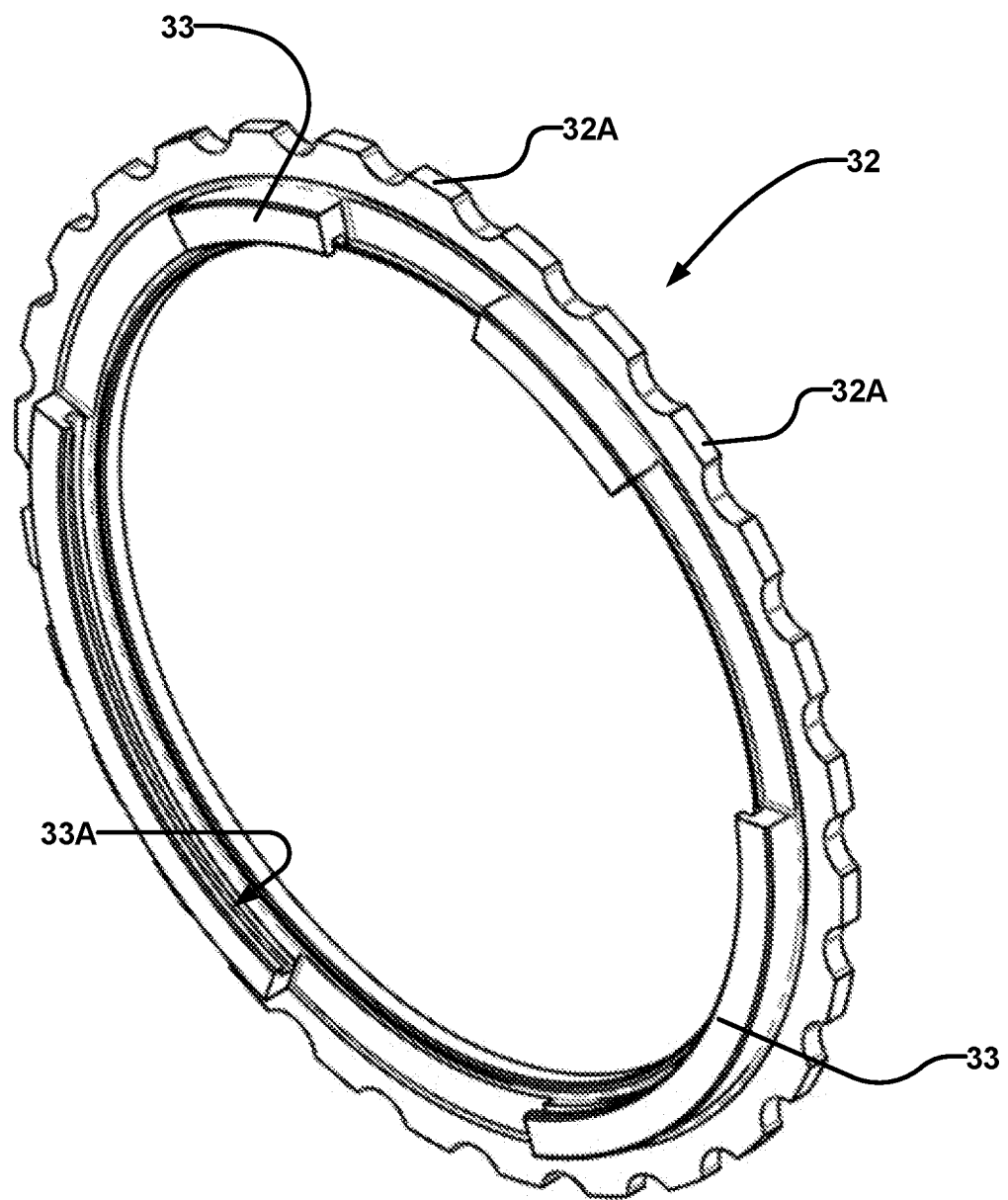
Figure 5B:
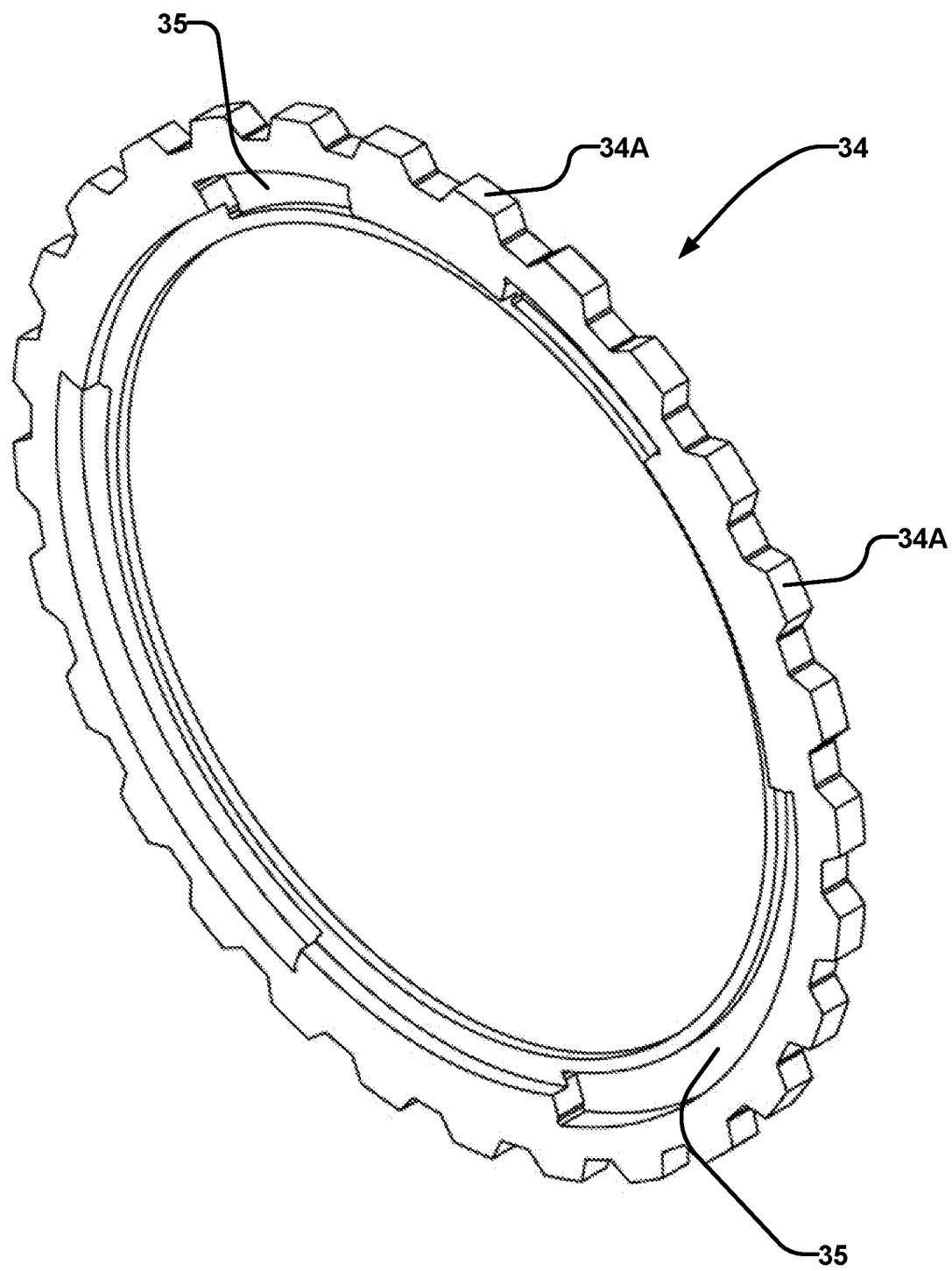

In some embodiments edges and/or corners of recesses or apertures 35 are chamfered (see e.g. FIGS. 4B and 5B). Chamfered edges/corners may facilitate easier insertion of corresponding bosses 33. Additionally, or alternatively, edges and/or corners of recesses or apertures 35 may be filleted.

Chamfering and/or filleting edges/corners of recesses or apertures 35 may advantageously facilitate easier and/or less costly manufacturing of backup plate assembly 30. For example, chamfering and/or filleting edges/corners of recesses or apertures 35 may make machining of recesses or apertures 35 easier, reduce expense of machining, etc.

As described above, coupling plates 32 and 34 together offsets teeth 32A from teeth 34A by a desired amount. Bosses 33 and corresponding recesses or apertures 35 may be angularly oriented relative to teeth 32A, 34A to produce the desired angular offset of teeth 32A relative to teeth 34A.

FIG. 4A is a perspective view of an example plate 32 comprising identical bosses 33 that are equally spaced apart from each other. FIG. 4B is a perspective view of an example plate 34 comprising corresponding recesses or apertures 35 configured to receive bosses 33 of FIG. 4A.

FIG. 5A is a perspective view of an example plate 32 comprising a plurality of bosses 33 that differ from one another. FIG. 5B schematically illustrates an example plate 34 comprising recesses or apertures 35 configured to receive bosses 33 of FIG. 5A.

As shown in FIGS. 4A-5B, different ones of bosses 33 may be the same size or have different sizes. Bosses 33 may also be equally spaced apart from adjacent bosses 33 or may be spaced apart by different amounts from adjacent bosses 33.

In some embodiments plate 34 comprises more recesses or apertures 35 than there are bosses 33 on a corresponding plate 32.

In some embodiments plate 32 comprises recesses or apertures 35 and plate 34 comprises bosses 33. In some embodiments each of plates 32 and 34 comprise at least one boss 33 and at least one recess or aperture 35.

Plates 32, 34 may be held together axially in any suitable way. Some examples are:
- fasteners such as screws, studs, rivets;
- internal or external snap rings;
- clamps;
- spot welding; etc.

In the example of FIG. 4A, each boss 33 comprises a groove 33A for receiving a snap ring 36. Once snap ring 36 is received within groove 33A, snap ring 36 secures bosses 33 in engagement with corresponding recesses or apertures 35 (and axially couples plate 32 with plate 34).

It is not necessary for plates 32 and 34 to comprise bosses 33 and recesses or apertures 35. Alternative couplings may couple plates 32 and 34 together and offset teeth 32A relative to teeth 34A.

Figure 6A:
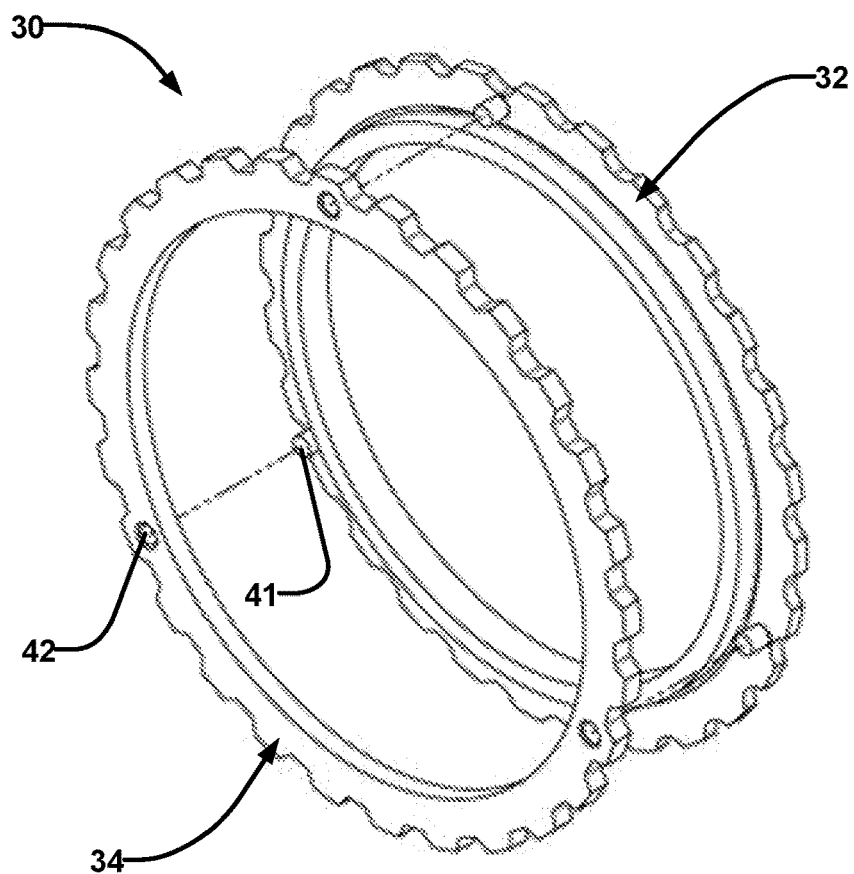
FIG. 6A is an exploded perspective view of a backup plate assembly according to an example embodiment.
Figure 6B:
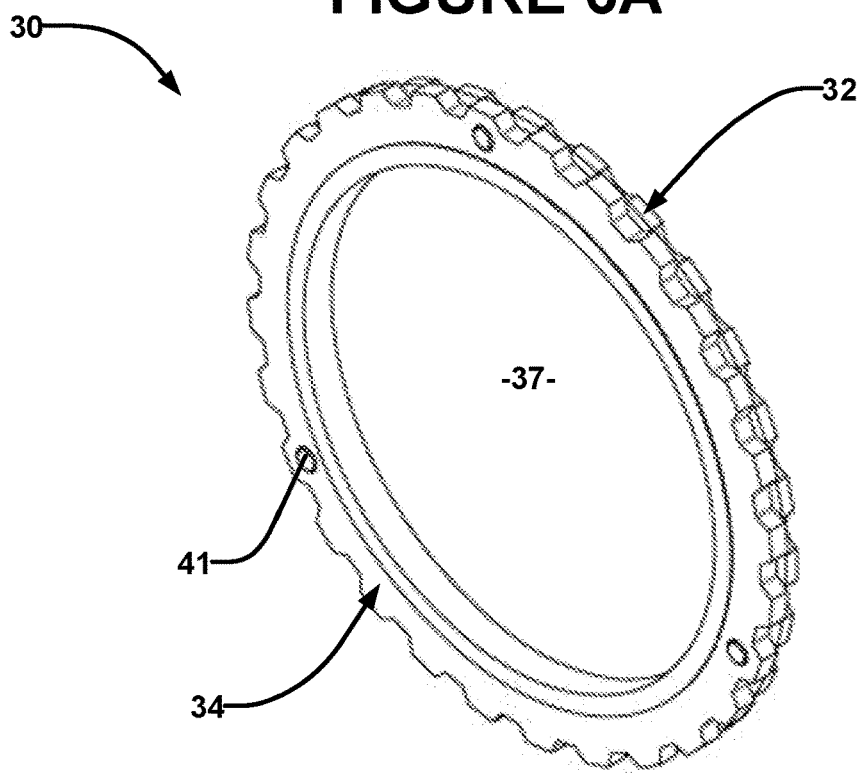
FIG. 6B is a perspective view of the backup plate assembly of FIG. 6A.
Figure 7A:
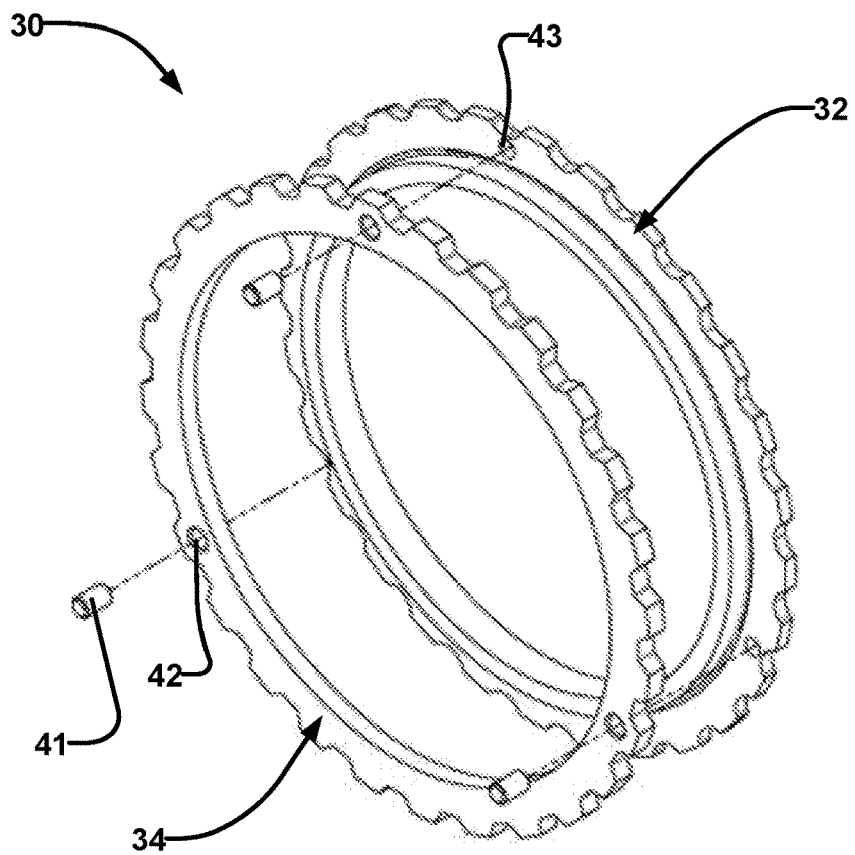
FIG. 7A is an exploded perspective view of a backup plate assembly according to an example embodiment.
Figure 7B:
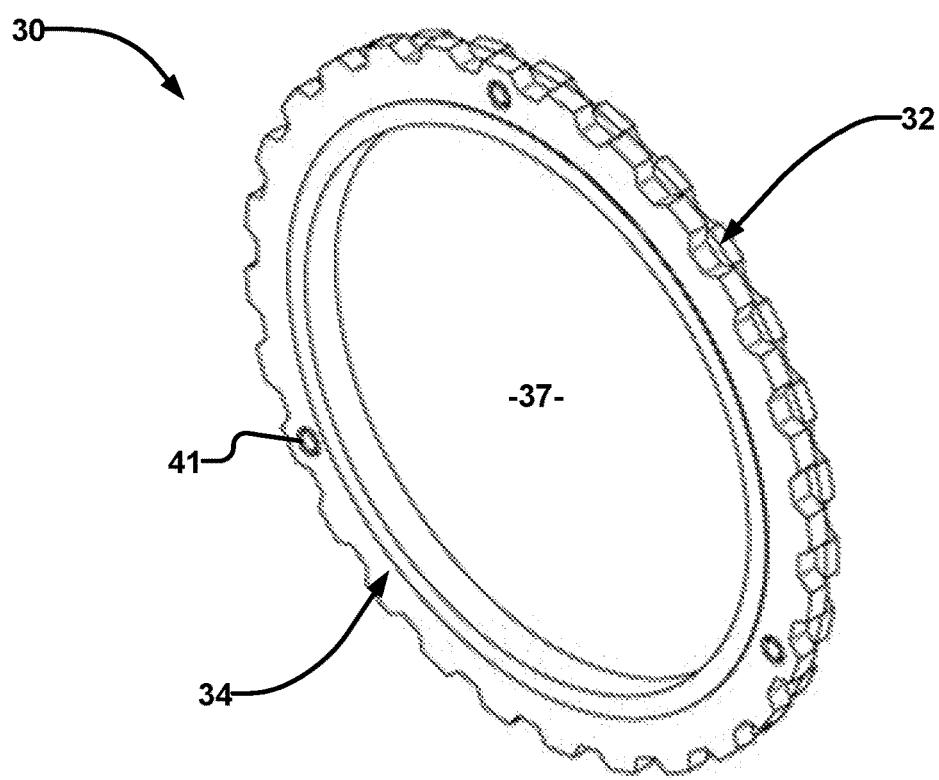
FIG. 7B is a perspective view of the backup plate assembly of FIG. 7A.
Figure 8A:
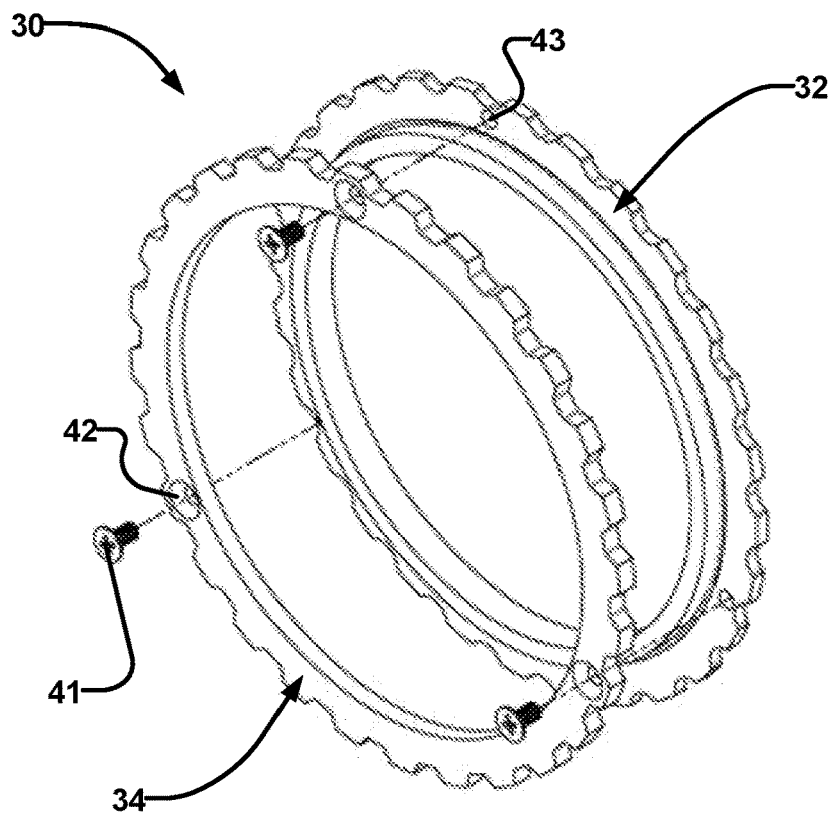
FIG. 8A is an exploded perspective view of a backup plate assembly according to an example embodiment.
Figure 8B:
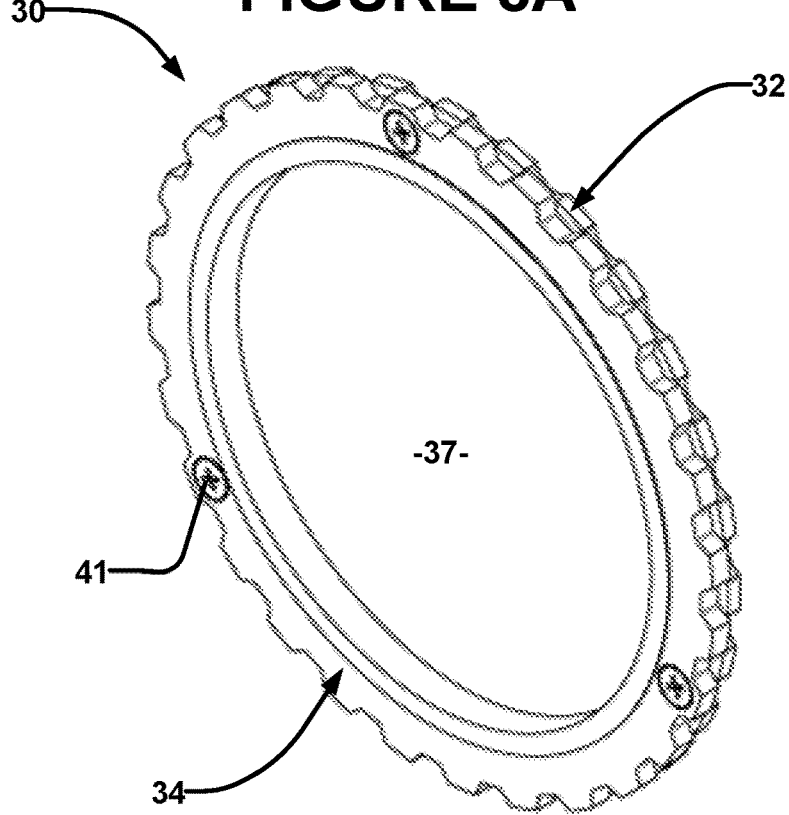
FIG. 8B is a perspective view of the backup plate assembly of FIG. 8A.

For example, fasteners 41 may couple plates 32 and 34 together in a way that holds plates 32, 34 together with the desired angular offset of teeth 32A, 34A and also prevents relative rotation of plates 32, 34. In some embodiments fasteners 41 are rigidly coupled to plate 32. In some such embodiments fasteners 41 are configured to pass through corresponding openings 42 of plate 34. In some such embodiments fasteners 41 comprise rivets as shown in FIGS. 6A and 6B. In some embodiments fasteners 41 are received by corresponding recesses or apertures 42 of plate 34 and corresponding recesses or apertures 43 of plate 32. In some such embodiments fasteners 41 comprise press-fit dowel pins as shown in FIGS. 7A and 7B. In some other embodiments fasteners 41 comprise threaded fasteners (e.g. screws and/or bolts) as shown in FIGS. 8A and 8B.

Recesses or apertures 42 and/or 43 may comprise inner surfaces which securely engage corresponding surfaces of fasteners 41. "Securely engages" means that plates 32 and 34 cannot significantly rotate or axially move relatively to one another when plates 32 and 34 are coupled together. In some embodiments inner surfaces of recesses or apertures 42 and/or 43 are smooth. In some embodiments inner surfaces of recesses or apertures 42 and/or 43 are threaded. Backup plate assembly 30 may comprise any number of fasteners 41 sufficient to couple plates 32 and 34 together. Adjacent fasteners 41 may be equally spaced apart from each other. However this is not mandatory.

Preferably, a top surface of each fastener 41 is flush with or does not project past an outer surface of plate 34. For example, inner surfaces of recesses or apertures 42 may be beveled to receive corresponding heads of fasteners 41 as shown in FIG. 8A.

FIGS. 6A to 8B illustrate backup plate assembly 30 as comprising a single type of fastener 41. However backup plate assembly 30 may comprise two or more different types of fasteners 41. For example, fasteners 41 of a backup plate assembly 30 may comprise one or more screws and in combination with one or more press-fit dowel pins.

Additionally, or alternatively, fasteners 41 and/or recesses or apertures 42, 43 may be interchanged on plates 32, 34. For example, plate 34 may comprise rigidly coupled fasteners 41 (e.g. rivets as described elsewhere herein) and plate 32 may comprise corresponding recesses or apertures 42.

Figure 9A:
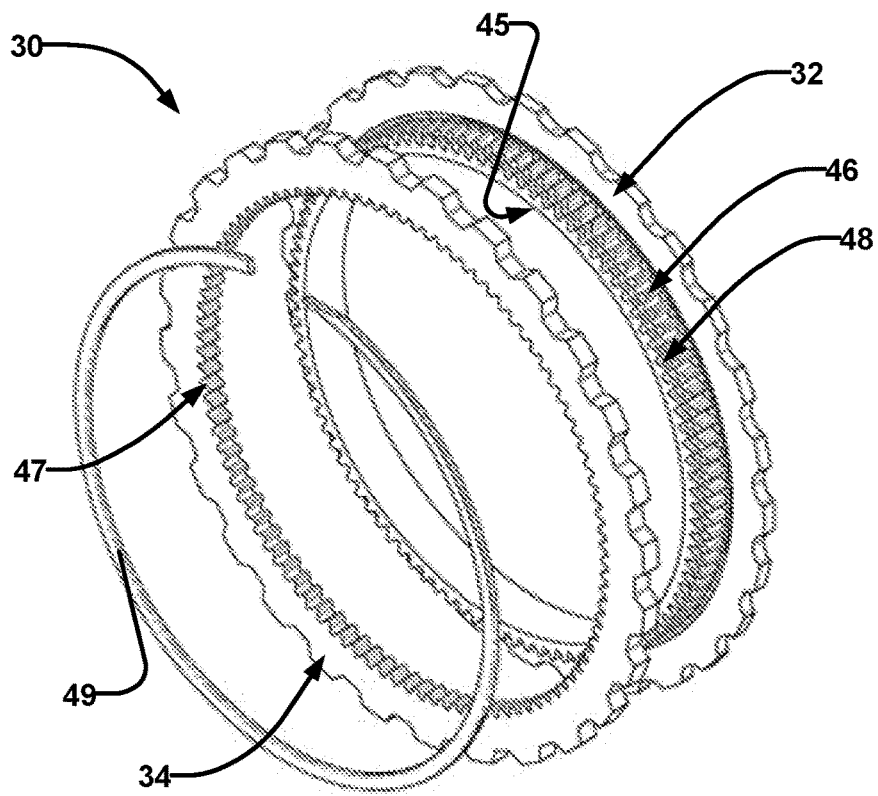
FIG. 9A is an exploded perspective view of a backup plate assembly according to an example embodiment.
Figure 9B:
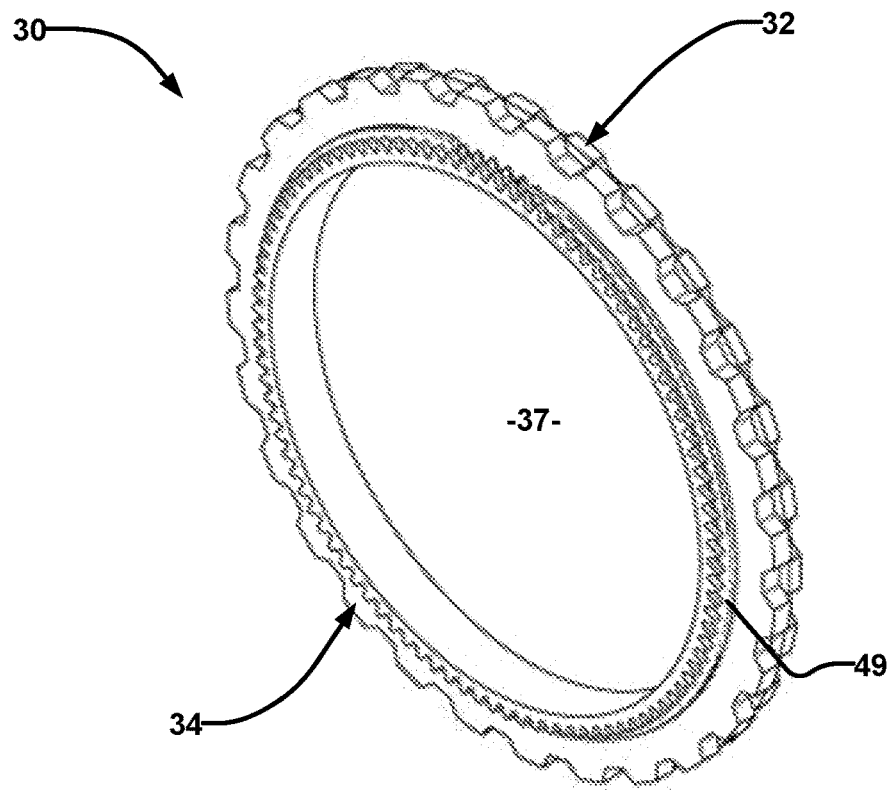
FIG. 9B is a perspective view of the backup plate assembly of FIG. 9A.

As another example, a splined coupling may rotationally couple plates 32 and 34 together. FIGS. 9A and 9B show an example of such a splined coupling. In the example embodiment shown in FIG. 9A, plate 32 comprises an axially outwardly projecting member 45. Member 45 comprises a plurality of splines 46. Plate 34 comprises a plurality of corresponding splines 47 around an inner diameter of plate 34. Meshing of splines 46 and 47 rotationally couples plates 32 and 34 together. Splines 46 and 47 prevent rotational movement of plates 32 and 34 relative to one another. To prevent axial movement of plates 32 and 34 relative to one another, a snap ring 49 may axially secure plate 32 relative to plate 34. For example, member 45 may comprise a snap ring groove 48 configured to receive snap ring 49 (see FIG. 9C). Additionally, or alternatively, one or more fasteners 41 described elsewhere herein may prevent axial movement of plates 32 and 34 relative to one another (not shown).

Figure 9C:
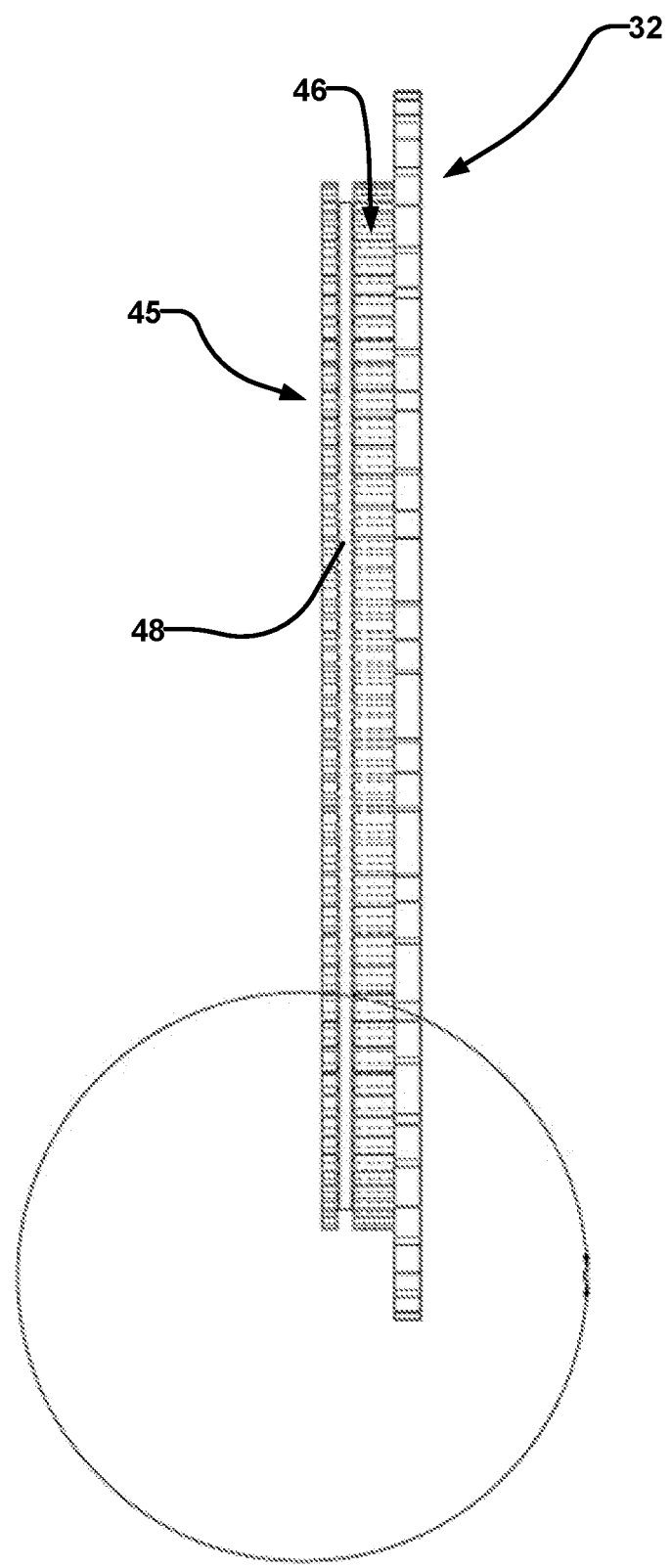
FIG. 9C is a side view of a plate of the backup plate assembly of FIG. 9A.

Although FIGS. 9A, 9B and 9C show plate 32 comprising member 45, this is not mandatory. In some embodiments plate 34 (instead of plate 32) comprises an axially inwardly projecting member equivalent to member 45.

Compression of clutch pack 22 typically frictionally engages an outermost clutch disk of clutch pack 22 with an inner surface of backup plate assembly 30. This may generate large amounts of heat. In preferred embodiments plate 32 (and/or plate 34) is made of a material capable of resisting such heat. Additionally, or alternatively, plate 32 and/or plate 34 are made of a material that may effectively dissipate the heat.

Any embodiment of backup plate assembly 30 may include a central aperture (e.g. central aperture 37 shown in FIGS. 3A, 6B, 7B, 8B and 9B) dimensioned to allow a concentric member (e.g. second shaft 16 and/or cog 17 described elsewhere herein) to extend through backup plate assembly 30 into drum 21.

A wide range of variations of the present technology are possible. For example:
  Evenly spacing teeth 32A, 34A may allow plates 32 and/or 34 to evenly dissipate applied forces. However, this is not mandatory. Teeth 32A and/or teeth 34A may be arranged symmetrically or unsymmetrically around plates 32, 34 respectively. Plates 32 and/or 34 may comprise an even or an odd number of teeth 32A, 34A respectively. Plates 32, 34 may have the same number of teeth as there are grooves 24B in drum 21 or fewer teeth (e.g. some teeth may be skipped);
  Plates 32 and/or 34 may be made of any presently known or future discovered material that is compatible with their application in a clutch in an automatic transmission or other application (e.g. will not prematurely fail under typical operating conditions of an automatic transmission).

Figure 10:
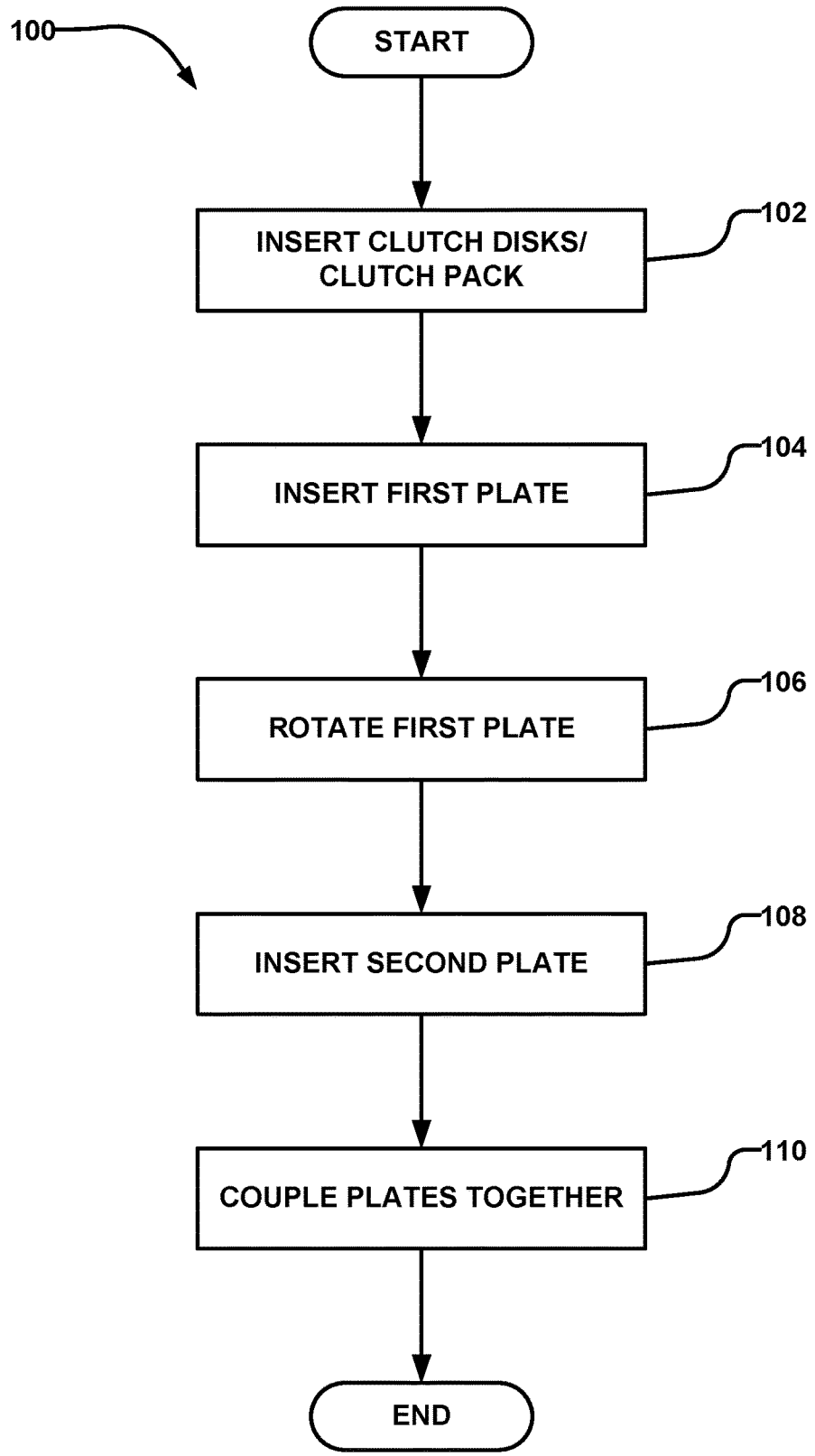
FIG. 10 is a flow chart of a method according to an example embodiment.

FIG. 10 is a flow chart illustrating an example method 100. Method 100 may couple backup plate assembly 30 with drum 21 of clutch 10A.

In block 102, a clutch pack comprising a plurality of clutch disks is inserted into a cavity defined by a drum of a clutch system (e.g. cavity 20 of clutch system 10A). In block 104, teeth of a first plate (e.g. plate 32 described elsewhere herein) are aligned with corresponding grooves in the drum (e.g. longitudinal grooves 24B) and the first plate is slid into the cavity. The first plate may, for example, be inserted into the cavity until the teeth enter a circumferential groove (e.g. snap ring groove 28 described elsewhere herein). In block 106, the first plate is rotated so that outer teeth of the first plate (e.g. teeth 32A) are received in corresponding portions of the circumferential groove between the longitudinal grooves.

In block 108 teeth of a second plate (e.g. plate 34) are aligned with the longitudinal grooves and the second plate is slid into the cavity. In block 110, the first and second plates are coupled together using any suitable coupling method such as those described elsewhere herein. Coupling of the first and second plates secures the first and second plates within the cavity of the drum.

Interpretation of Terms

Unless the context clearly requires otherwise, throughout the description and the claims:
  "comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g. an assembly, device, mechanism, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A backup plate assembly for a clutch of an automatic transmission, the assembly comprising:
   a first plate comprising a first plurality of teeth spaced apart around an outer circumference of the first plate, the teeth of the first plurality of teeth removably insertable into corresponding portions of a circumferential groove which extends around an inner surface of a drum of the clutch; and
   a second plate couplable with the first plate, the second plate comprising a second plurality of teeth spaced apart around an outer circumference of the second plate, the teeth of the second plurality of teeth removably insertable in corresponding longitudinal grooves of the drum, the longitudinal grooves extending longitudinally inwards into the drum;
   wherein the first plurality of teeth is angularly offsetable from the second plurality of teeth; and
   wherein coupling the first and second plates together preserves an angular offset between the first and second pluralities of teeth.

2. The backup plate assembly of claim 1 wherein coupling the first and second plates together secures the teeth of the first plurality of teeth in the corresponding portions of the circumferential groove and the teeth of the second plurality of teeth in the corresponding longitudinal grooves of the drum.

3. The backup plate assembly of claim 2 wherein an inner surface of the first plate abuts an inner edge of the circumferential groove.

4. The backup plate assembly of claim 3 wherein the circumferential groove is configured to receive a snap ring.

5. The backup plate assembly of claim 1 wherein the first plate comprises at least one boss and the second plate comprises at least one corresponding aperture or recess configured to receive the boss.

6. The backup plate assembly of claim 5 wherein the at least one boss comprises a snap ring groove configured to receive a snap ring, the snap ring configured to axially secure the first plate relative to the second plate.

7. The backup plate assembly of claim 5 wherein the at least one aperture or recess comprises one or both of chamfered and/or filleted edges and chamfered and/or filleted corners.

8. The backup plate assembly of claim 5 wherein the first plate comprises a plurality of bosses and the second plate comprises a plurality of corresponding apertures or recesses configured to receive the bosses.

9. The backup plate assembly of claim 8 wherein each one of the plurality of bosses is identical to the other ones of the plurality and each of the apertures or recesses of the plurality is identical to the other ones of the plurality.

10. The backup plate assembly of claim 9 wherein each of the bosses and each of the apertures are equally spaced apart around the first and second plates respectively.

11. The backup plate assembly of claim 8 wherein at least two bosses in the plurality of bosses are different from one another.

12. The backup plate assembly of claim 1 wherein the first plate comprises at least one rivet rigidly coupled to the first plate and the second plate comprises a corresponding aperture configured to receive the at least one rivet.

13. The backup plate assembly of claim 1 wherein the first and second plates comprise corresponding apertures configured to receive a fastener.

14. The backup plate assembly of claim 13 wherein the fastener comprises at least one of a press-fit dowel pin and a threaded fastener.

15. The backup plate assembly of claim 1 wherein the first plate comprises an axially outwardly projecting member comprising a first plurality of splines and the second plate comprises a second plurality of corresponding splines on an inner diameter of the second plate, wherein meshing the first plurality of splines with the second plurality of corresponding splines rotationally secures the first plate relative to the second plate.

16. The backup plate assembly of claim 15 wherein the axially outwardly projecting member of the first plate comprises a snap ring groove, the snap ring grove of the projecting member configured to receive a snap ring, the snap ring configured to axially secure the first plate relative to the second plate.

17. The backup plate assembly of claim 1 wherein teeth of one or both of the first and second plates are evenly spaced apart from adjacent teeth.

18. An automatic clutch comprising:
a drum comprising:
a cavity longitudinally extending between first and second ends of the drum;
longitudinal grooves extending longitudinally inwards from the first end towards the second end of the drum along an inner surface of the drum; and
a circumferential groove extending around an inner surface of the drum, the circumferential groove proximate to the first end of the drum; and
a backup plate assembly according to claim 1 coupled to the drum proximate to the first end of the drum.

19. The clutch of claim 18 wherein at least one portion of the circumferential groove is between adjacent ones of the longitudinally extending grooves.

20. A method for coupling a backup plate assembly according to claim 1 to a drum of a clutch for an automatic transmission, the method comprising:
inserting the first plurality of teeth of the first plate into corresponding longitudinal grooves of the drum;
rotating the first plate relative to the drum to insert the first plurality of teeth into corresponding portions of a circumferential groove extending around an inner diameter of the drum;
inserting the second plurality of teeth of the second plate into the corresponding longitudinal grooves; and
coupling the first and second plates together.

* * * * *